Figure 1:
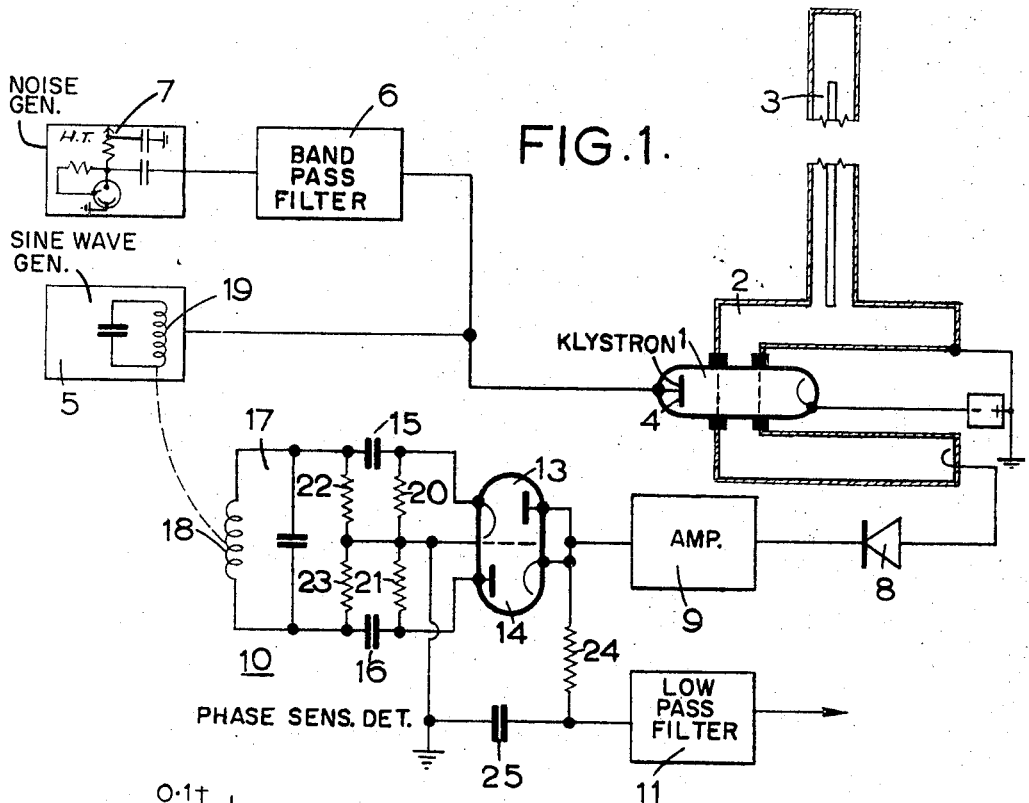

United States Patent
Bowman-Manifold

[11] 3,839,718
[45] Oct. 1, 1974

[54] RANGE SENSITIVE DEVICES
[75] Inventor: Michael Bowman-Manifold, Alton, England
[73] Assignee: EMI Limited, Middlesex, England
[22] Filed: Oct. 19, 1954
[21] Appl. No.: 463,143

[30] Foreign Application Priority Data
Oct. 23, 1953 Great Britain .................... 29281/53

[52] U.S. Cl. ................................. 343/14, 343/7 PF
[51] Int. Cl. ............................................. G01s 9/24
[58] Field of Search ............. 343/7, 14, 17.5, 17.2, 343/7 PF; 332/22; 102/70.2 P

[56] References Cited
UNITED STATES PATENTS
2,923,004  1/1960  Warnecke et al. ..................... 343/14

*Primary Examiner*—T. H. Tubbesing
*Attorney, Agent, or Firm*—Fleit, Gipple & Jacobson

[57] ABSTRACT

This invention relates to a radar ranging system wherein a noise signal and a sine wave signal are combined to frequency modulate the radar carrier signal. The radar system may be used in conjunction with a proximity fuze.

5 Claims, 5 Drawing Figures

$\dfrac{\omega_1}{2\pi} = 0.5\,\text{Mc/s}.$ $\dfrac{\omega_2}{2\pi} = 0.2\,\text{Mc/s}.$ $\dfrac{\omega_1}{2\pi} = 0.15\,\text{Mc/s}.$ $\dfrac{\omega_2}{2\pi} = 0.10\,\text{Mc/s}.$

RANGE SENSITIVE DEVICES

This invention relates to range sensitive devices, especially but not exclusively proximity fuzes.

In missiles which have proximity fuzes it is necessary that the missile be detonated on reaching a position close to the target. For this purpose, it has been proposed to provide a proximity fuze comprising a klystron or other high frequency oscillator having a mean frequency of the order of 1,000 Mc/s (for example) and which is frequency modulated by a sinewave of predetermined frequency, say 2.5 Mc/s. The frequency modulated oscillations are radiated from an aerial or array of aerials and if these oscillations are reflected from a target, they are picked up by the same or a special receiving aerial or array of aerials, mixed with oscillations from the klystron, and passed to an amplitude detector. The output of the amplitude detector contains target signals which are harmonics of the modulation frequency and one of these harmonics is selected and detected. The result of the latter detection is then a signal whose value is a function of the target range, and it is employed to operate a fuze firing circuit. The signal is the product of the strength of the reflected field which reaches the missile, and of a range function which depends on the system and in particular, on which harmonic has been selected. To protect the fuze from disturbances on or very close to the surface of the missile, it is an advantage to use a range function which is zero at zero range, and systems with a quadratic or third power range law have been proposed. With increasing distance, the range function has alternate maxima and minima at intervals related to the wavelength of the modulating frequency. This repetitive nature of the range function is a disadvantage inasmuch as there is liability for false operation of the fuze firing circuit, due to echoes from distant objects. To reduce this disadvantage it has been proposed to modulate the klystron with two superimposed sinewaves differing considerably in frequency, the second sinewave having for example a frequency of two-fifteenths that of the first. This suppresses many of the secondary maxima in the range function but nevertheless the maxima re-appear periodically corresponding to the frequncy of the second sinewave. It has also been proposed to modulate the klystron by means of a non-periodic waveform of the nature of noise, instead of by means of a sinewave. This proposal tends, however, to produce a range law which, at least in the vicinity of the target, is linear with range and the advantage of the quadratic or higher order law is lost.

Similar disadvantages may exist in connection with other range sensitive devices, and the object of the present invention is to reduce such disadvantages.

According to the present invention there is provided a range sensitive device having means for radiating frequency modulated oscillations and means for picking up reflected oscillations and deriving a range sensitive signal in response thereto, said radiated oscillation being modulated in frequency by a periodic waveform and a waveform having a series of components of different frequencies and random phase relationships so as to reduce substantially repetitions in the signal/range function of the device.

The second waveform is preferably noise derived by the band-pass filtering of a source of a large number of small pulses occurring at random time intervals. The source may for example consist of a diode or gas discharge tube.

In order that the invention may be clearly understood and readily carried into effect, the invention will be described with reference to the accompanying drawings.

Figure 2A:
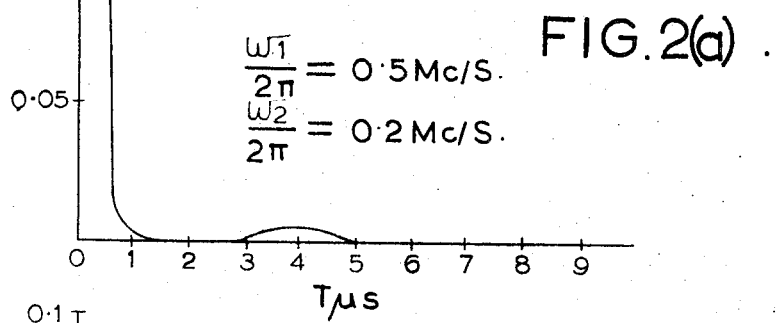
Figure 2B:
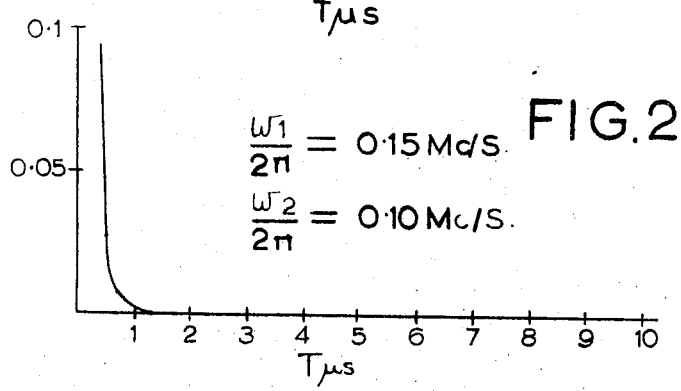
Figure 2C:
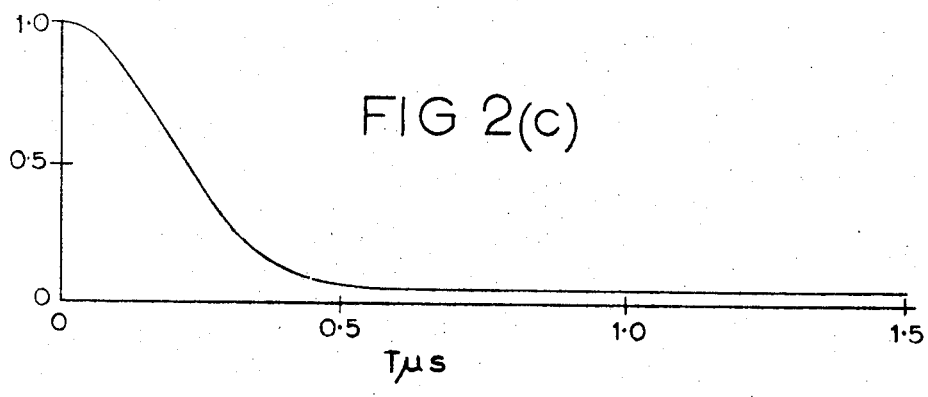
Figure 3:
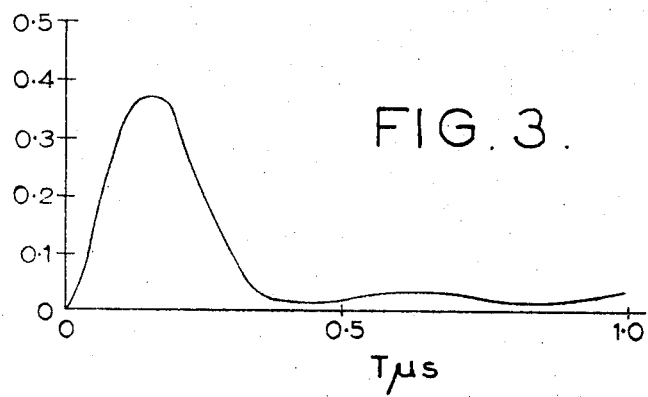

FIG. 1 illustrates diagrammatically and partly in block form one example of the range sensitive part of a proximity fuze in accordance with the present invention, FIGS. 2A–2C comprise theoretical graphs which will be referred to in explanation of FIG. 1, and FIG. 3 is the theoretical range function of the circuit shown in FIG. 1.

Referring to the drawings, the circuit shown in FIG. 1 comprises a reflex klystron valve 1 having a λ/4 coaxial line resonator 2, the klystron being operated at a centre frequency of the order of 1,000 Mc/s. A slot aerial 3 is directly coupled to the klystron resonator by an aperture in the outer conductor of the resonator. The klystron reflector 4 receives voltages from a sinewave oscillator 5 the output of which iw a sinewave electromotive force having a frequency of 2.5 Mc/s. The reflector 4 also receives voltages from a band-pass filter denoted by the block 6 which is arranged to filter the output of a source 7 of noise, the source being for example a diode or a gas discharge tube. The band-pass of the filter 6 extends from 0.2 to 0.5 Mc/s. The combined sinewave and noise waveform voltages applied to the reflector 4 of the klystron frequency modulate the oscillations generated by the klystron and fed to the aerial 3. It will be assumed that the maximum frequency deviation produced by the sinewave voltage is ± 2.3 Mc/s whilst the deviation produced by noise voltage is 0.87 Mc/s R.M.S. An amplitude detector represented as a crystal diode 8 is loop-coupled to the klystron resonator 2 and the detector output is fed to a high gain amplifier 9 having a pass-band extending from 2.1 to 2.9 Mc/s (approximately) and designed to cause zero phase displacement at 2.5 Mc/s. The output of the amplifier is applied to a phase sensitive detector denoted in general by the reference numeral 10 and the output of the detector 10 is applied to a low pass filter 11, the pass range of which extends from 0 to 3 Kc/s. The detector 10 comprises two diodes 13 and 14 oppositely polarised as shown, the output of the amplifier 9 being applied in parallel to the anode of the diode 13 and to the cathode of the diode 14. The cathode of the diode 13 and the anode of the diode 14 are coupled via capacitors 15 and 16 to the opposite ends of a tuned circuit 17, the inductance 18 in which is weakly coupled to an inductance 19 in the tuned circuit of the oscillator 5, the coupling being such that a push-pull reference voltage having the frequency of 2.5 Mc/s is applied to the diodes 13 and 14 in phase quadrature to the voltage output of the oscillator 5. The detector 10 further comprises resistors 20, 21, 22, 23 and 24 and a capacitor 25. The output of the detector is taken from across the capacitor 25 and applied to the low pass filter 11.

In operation of the circuit illustrated, the signal radiated from the aerial 3 can be represented by $$\cos(2\pi f_o t + \Phi(t) + [kf_o \sin 2\pi pt/p])$$

In this formula, $f_o$ represents the carrier or centre frequency of the klystron 1, $p$ the frequency of the oscillator 5, $kf_o$ the peak deviation of frequency produced by the oscillations of frequency $p$, and $\Phi(t)$ is a time function defining phase displacement due to noise modulation. In the example described, $\Phi(t)$ is the component due to noise and is not a definable time function, but it can be partially Fourier analysed. The amplitude of every frequency component can in principle be stated, but not the phase. A perfectly sharp pulse contains all frequencies between zero and infinity equally and a definite phase relationship between its components. Source 7 is a source of a large number of very small sharp pulses, occurring at random time intervals, and such pulses add together to produce a combined signal, in which the spectrum will be the same as that of a single sharp pulse, but the phase relationship between the frequencies will be completely confused. The filter 6 imposes an upper and lower limit on the frequency spectrum of the noise from the source 7.

Let the radiated signal after reflection from a target be picked up by the aerial after a time delay T and with an amplitude reduction factor $\rho$. The signal which is picked up is added to the original signal and amplitude detected by the detector 8. The alternating part of the enveloped-amplitude, and consequently the output of the detector 8 is proportional to $\rho$ cos (the instantaneous phase difference).

Using the Bessel expansion, it can be shown that the alternating part of the detector output can be represented by a series of the form $$\rho\cos\phi\,[J_0(z) - 2\{J_2(z)\cos 2\theta - J_4(z)\cos 4\theta \ldots\}]$$
$$- 2\rho\sin\phi\,[J_1(z)\cos\theta - J_3(z)\cos 3\theta \ldots]  \quad (1)$$

In this series:

$$z = (2kf_o \sin \pi pT)/p$$

$$\theta = 2\pi p\,(t - T/2)$$

$$\theta = \Phi(t) - \Phi(t - T) + 2\pi f_o T$$

$T$ is decreasing with time as the missile approaches the target.

The amplifier 9 picks out a band centred on the modulation frequency $p$. This is chiefly the $J_1(z)$ term in the series (1) though not exclusively, since the function $\rho\sin\phi$, being a frequency modulation, has an infinite spectrum. The phase sensitive detector 10 removes the frequency $p$ and retains the low frequency amplitude modulation of only that part of the amplifier output which is 90° out of phase with the modulator voltage from 5 applied at 4. This term is $$- 2\,\rho\,\sin\phi\,J_1(z)\,\sin \pi pT$$

The detector output is filtered by the low pass filter to retain only its low frequency components, i.e., not exceeding the highest probable doppler frequency. It can be shown theoretically that, subject to certain approximations, the output voltage derived from the filter 11 conforms to a range function of the form of $$J_1(z)\,\sin\,(\pi pT) \quad \sqrt{(av\,\cos\,(T))^2 + 0.004}$$

where $av$ denotes the linear average over a long period, and may be represented by the infinite average regarding $T$ as constant. Cos $(T)$ is an abbreviation for $$\cos\{\Phi(t) - \Phi(t - T)\}$$

FIGS. 2(a) and 2(b) are graphs in which the ordinates are $$av\,\cos\,(T)$$

and abscissae are T, the graphs being plotted for different values of $\omega_1$ and $\omega_2$ where $\omega_2/2\pi$ is the lower and $\omega_1/2\pi$ is the upper limit of bandpass filter 6. For both graphs the R.M.S. deviation of frequency, that is the R.M.S. volts of the noise waveform multiplied by the frequency deviation produced per volt, is 0.87 Mc/s. The continuation of the graphs to $T = 0$ is not shown, but in each case the graph turns over to a value of unity at $T = 0$. The graph of FIG. 2(a) corresonds to the circuit parameters ascribed to FIG. 1.

FIG. 2(c) is a graph of $$\sqrt{(av\,\cos\,(T))^2 + 0.004}.$$

for the case of the parameters ascribed to FIG. 1. FIG. 3 is the final static range function, that is the range function neglecting the influence of space attenuation, and it expresses the average amplitude of the signal output from the filter 11 in arbitrary units in terms of T, and thus of the range of the target. The actual amplitude of the signal output from 11 will display doppler beats. By a suitable choice of the R.M.S. frequency deviation due to the noise waveform, it is arranged that the first maximum due to the sine waveform modulation alone is not excessively attenuated, but that all other maxima are effectively suppressed. The advantages of a quadratic range function in the vicinity of the target are therefore retained.

Modifications may be made in the circuit described, for example, lower noise frequencies may be used to allow for the use of a narrow noise frequency band. Moreover, instead of picking out the first harmonic of the modulating frequency, any desired term in the aforesaid series (1) can be selected by means of band pass filtering.

It is to be understood that the invention is not confined in its application to proximity fuzes of the construction illustrated in the drawing.

What I claim is:

1. A range sensitive device comprising means for generating a periodic electrical waveform, means for generating another electrical waveform having a series of components of different frequencies and random phase relationships, means for generating a carrier oscillation modulated in frequency by said waveforms, means for radiating said frequency modulated oscillation, means for receiving oscillations reflected from an object whose range is to be determined, and means for deriving, in response to said received oscillation, an output signal representing the range of said object.

2. A range sensitive device as in claim 1 in which the generator of said second waveform comprises an electrical noise source.

3. A range sensitive device comprising means for generating a sinusoidal electrical waveform, means for generating another electrical waveform having a series of components of different frequencies and random phase relationships, means for generating a carrier oscillation modulated in frequency by said waveforms, means for radiating said frequency modulated oscillation, means for receiving oscillations reflected from an object whose range is to be determined, and means for deriving, in response to said received oscillation, an output signal representing the range of said object.

4. A range sensitive device comprising means for generating a sinusoidal electrical oscillation, means for generating an electrical noise signal, means for generating a carrier oscillation modulated in frequency by said sinusoidal oscillations and said noise signal, means for radiating said frequency modulated oscillation, means for receiving oscillations reflected from an object whose range is to be determined, and means for deriving, in response to said received oscillation, an output signal representing the range of said object.

5. A range sensitive device according to claim 4 in which the generator of said noise signal comprises an electric discharge tube and a band-pass filter.

* * * * *